United States Patent [19]

Alberts et al.

[11] 4,230,823
[45] Oct. 28, 1980

[54] POLYURETHANE FOAMS AND ELASTOMERS BASED ON MODIFIED POLYETHER POLYOLS

[75] Inventors: Heinrich Alberts, Cologne; Gerhard Ballé, Leverkusen, both of Fed. Rep. of Germany

[73] Assignee: Bayer Aktiengesellschaft, Fed. Rep. of Germany

[21] Appl. No.: 65,307

[22] Filed: Aug. 9, 1979

[30] Foreign Application Priority Data

Aug. 24, 1978 [DE] Fed. Rep. of Germany ....... 2837026

[51] Int. Cl.² .................. C08G 18/14; C08G 18/50; C08K 5/06
[52] U.S. Cl. .......................... 521/137; 260/33.2 R; 260/45.95 R; 525/50; 525/529; 521/158; 528/75; 568/667
[58] Field of Search .................. 528/75; 525/50, 529; 521/137; 260/33.2 R

[56] References Cited

U.S. PATENT DOCUMENTS

| | | | |
|---|---|---|---|
| 3,304,273 | 2/1967 | Stamberger | 260/33.2R |
| 3,383,351 | 5/1968 | Stamberger | 260/2.5 |
| 3,966,521 | 6/1976 | Patton et al. | 521/137 |
| 4,014,846 | 3/1977 | Ramlow et al. | 260/33.2 R |
| 4,021,383 | 5/1977 | Cuscurida et al. | 521/137 |
| 4,021,384 | 5/1977 | Brader et al. | 521/137 |
| 4,104,236 | 8/1978 | Simroth | 260/33.2 R |
| 4,172,825 | 6/1979 | Shook et al. | 521/137 |

FOREIGN PATENT DOCUMENTS

987618  3/1965  United Kingdom .

OTHER PUBLICATIONS

DAS, 1,152,537, Bayer A/G, Aug. 8, 1963.
DAS, 1,152,536, Bayer A/G, Aug. 8, 1963.
DAS, 1,222,669, Union Carbide, Aug. 11, 1966.
DOS, 1,668,091, Bayer A/G, Feb. 1, 1973.
DOS, 1,768,396, Bayer A/G, Oct. 19, 1972.

*Primary Examiner*—H. S. Cockeram
*Attorney, Agent, or Firm*—Gene Harsh; Joseph C. Gil; R. Brent Olson

[57] ABSTRACT

The instant invention is directed to a process for the preparation of modified polyether polyols comprising polymerizing of from 1 to 50 parts by weight of a mixture of 20 to 100% by weight (based on the total quantity of monomers) of acrylonitrile and 0 to 80% by weight of styrene in 50 to 99 parts by weight of the polyether polyol in the presence of a polymerization initiator which yields radicals, wherein said polymerization is carried out in the presence of from 0.1 to 1.5% by weight, based on the total quantity of monomers put into the process, of a compound of the formula:

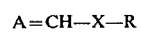

wherein
A represents a divalent group

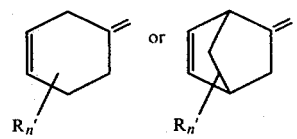

R represents a $C_{1-18}$ alkyl, $C_{1-10}$ cycloalkyl, or substituted or unsubstituted benzyl group,
R' represents $C_{1-8}$ alkyl group,
n represents 0, 1 or 2 and
X represents oxygen or sulfur.

15 Claims, No Drawings

POLYURETHANE FOAMS AND ELASTOMERS BASED ON MODIFIED POLYETHER POLYOLS

DESCRIPTION OF THE INVENTION

Polyether polyols modified by polymers or copolymers of olefinically unsaturated monomers and their use for the production of polyurethane resins are known. They are prepared by the in situ polymerization of one or more vinyl monomers in the usual polyether polyols in the presence of a radical forming polymerization initiator. Acrylonitrile and mixtures thereof with styrene have become the most important commercially. The preparation and use of such products have been described in U.S. Pat. Nos. 3,304,273 and 3,383,351 and German Pat. Nos. 1,222,669; 1,152,536 and 1,152,537.

Polyurethanes prepared from such polymer polyols are distinguished by their improved properties. In particular, the hardness and load bearing capacity of flexible polyurethane foams are improved so that the foams may be produced with lower unit weights, thus with less consumption of raw material.

In addition, the polymer polyols make flexible foams more open-celled and thereby counteract shrinkage of the fresh foams in storage. Finally, the polymer polyols, with suitable choice of the polyether, may be used to produce so-called highly elastic, cold setting, foams. In contrast to conventional processes for the production of such foams, it is not necessary to use any special polyisocyanates with accurately adjusted reactivity but only readily available products, such as tolylene diisocyanate.

Polymer polyols are, in the ideal case, relatively low viscosity, finely divided, non-sedimenting dispersions of the polymer in the substantially unchanged polyether polyols. The preferred polymer is an acrylonitrile or acrylonitrile styrene graft copolymer. The features which characterize the processability of the polymer polyols are their viscosity, stability in storage (resistance to sedimentation) and particle size. These properties are mainly influenced by the nature and quantitative proportions of the starting materials. If one considers monomer mixtures of acrylonitrile and styrene and optionally minor proportions of other comonomers, it is found that for a given molecular weight of the polyether used as initiator, optimum properties in the polymer polyols (lowest possible viscosity; freedom from sedimentation and agglomeration; low particle size) are obtained within a relatively narrow range of operating conditions. Parameters which have a particularly important influence on the quality of the product are the proportion of the monomer in the starting mixture and the monomer ratios. Starting from a polymerization reaction mixture containing pure acrylonitrile, the viscosity, particle size and amount of agglomerate increase with increasing styrene content and rise sharply with the increasing total proportion of monomer, based on the polyether. The aforesaid properties also increase with decreasing molecular weight of starting material and with a decrease in polymerization temperature to below 100° C.

Stabilization of the polymer polyol dispersions against sedimentation is achieved by the incorporation of a proportion of the molecules of the basic polyether into the polymer which is formed in situ. It may, therefore, be assumed that the reaction conditions influence the frequency of grafting, so that maximum frequency of grafting, which ensures stability in storage and processability of the product, is achieved only at the optimum point in the field of variables. If the process is carried out outside the limits of this field, the viscosity and particle size of the polymer polyol increase to the point of agglomeration and sedimentation. If polyethers with low chain lengths and polyethers with an equivalent weight $<1{,}000$ are used, highly viscous suspensions of coarse particles result.

The known literature does not teach how these limitations in the process for the preparation of polymer polyols can be overcome and how the properties of the product could be improved in reaction mixtures in which viscosity and particle size are critical.

It would be desirable to use a higher solids content regardless of the molecular weight of the starting polyether to enhance the properties and allow the operator to mix the product with other polyols and adapt it to the requirements of his polyurethane foams. At the same time, the working up properties of the product must not be deleteriously affected, i.e. the viscosity and particle size must not increase unduly.

It has been proposed to use conventional molecular weight regulators and telogens for the in situ polymerization for the purpose of lowering the viscosity of polymer polyols in critical reaction mixtures. This measure has not led to the required result, because these substances, e.g. the mercaptans commonly used in polymerization technology, compete with the polyether polyol as transferers with a high transfer constant. If anything, they tend to lower the grafting yield. Although the quality of the product can to a certain extent be improved by increasing the concentration of initiator, there are limits to this measure.

An increase in the quantity of peroxide added involves the risk of damage to the polyether by oxidation. This favors degradation and cross-linking reactions. The resulting by-products may cause discoloration at the center of any foam product. Azoisobutyronitrile (AIBN) which has been used commercially with considerable success, gives rise to a toxic by-product on thermal decomposition so that in this case the concentration of initiator should also be kept as low as possible.

Effective transferers which result in a relatively low viscosity of the polymer polyol even with relatively high solids contents and prevent particle agglomeration without impairing the stability in storage have now been found. They are in the form of enol ethers corresponding to the following general formula

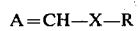

in which
A represents the divalent group

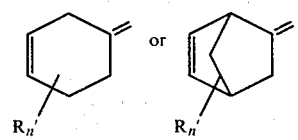

R represents a $C_{1-18}$ alkyl, $C_{5-10}$ cycloalkyl, or substituted or unsubstituted benzyl group; preferably $C_{1-8}$ alkyl, cyclohexyl, cyclohexylmethyl or benzyl group, R' represents $C_{1-8}$ alkyl group, preferably a methyl group, n is 0, 1 or 2 and X is oxygen or sulfur.

Dispersions which are easily processed and free from agglomerates and have polymer contents of up to 50% can be obtained by adding these compounds to the polymerization reaction mixture even if the monomer mixtures have a high styrene content. Furthermore, the polyethers used as starting material may have an equivalent weight of ≦1,000.

This invention thus relates to a process for the preparation of modified polyether polyols by the radical polymerization of from 1 to 50 parts by weight, preferably from 10 to 40 parts by weight of a mixture of 20 to 100% by weight, preferably 40 to 80% by weight, based on the total quantity of monomers, of acrylonitrile and 0 to 80% by weight, preferably 20 to 60% by weight of styrene in 50 to 99 parts by weight, preferably 60 to 90 parts by weight of a polyether polyol in the presence of a polymerization initiator which yields radicals, characterized in that polymerization is carried out in the presence of from 0.1 to 1.5% by weight, based on the quantity of monomers put into the process of a compound corresponding to the following general structural formula

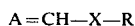

A=CH—X—R in which

A represents a divalent radical

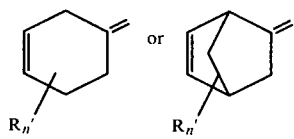

R represents a $C_{1-18}$ alkyl, $C_{5-10}$ cycloalkyl, or substituted or unsubstituted benzyl group, preferably $C_{1-8}$ alkyl, cyclohexyl, cyclohexylmethyl or benzyl group, R' represents $C_{1-8}$ alkyl group, preferably a methyl group, n 0, 1 or 2 and X is oxygen or sulfur.

The compounds to be added according to the invention are known in the literature. Their preparation has been described, for example, in German Auslegeschriften 1,668,091 and 1,768,396, the disclosures of which are herein incorporated by reference. Enol ethers suitable for the process according to the invention include inter alia, those corresponding to the following structural formulae which, however, are only examples of the large class of products which may be used according to the invention.

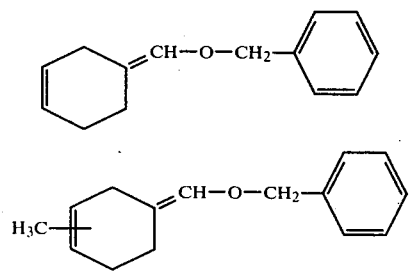

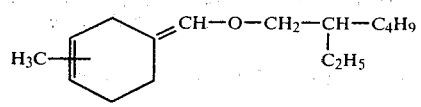

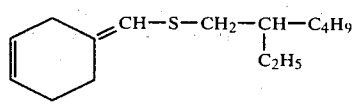

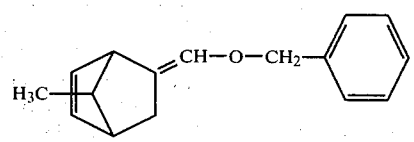

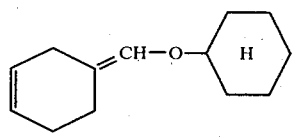

The (thio)/enol ethers are used in quantities of from 0.1 to 1.5% by weight, preferably from 0.5 to 1.2% by weight, based on the monomers used in the process.

Monomers suitable for the in situ graft polymerization are acrylonitrile and mixtures with styrene in proportions by weight in the range of from 100:0 to 20:80, preferably from 80:20 to 40:60. Minor quantities of copolymerizable monomers may be used in addition. Examples include esters of unsaturated monocarboxylic acids (such as acrylic acid, methacrylic acid, maleic acid, fumaric acid or itaconic acid) with lower alcohols having from 1 to 8 carbon atoms. Monoesters or diesters of the above-mentioned carboxylic acids with glycols, polyglycols or higher hydric alcohols; vinyl acetate; vinyl chloride; vinyl-idene chloride; methacrylonitrile; acrylamide; methacrylamide; amino alcohols (2-N,N-dimethylaminoethylmethacrylate) or esters of vinyl phosphonic acid (vinyl phosphonic acid dimethyl ester).

The polyether polyols which may be used as starting materials for the process according to the invention include the known addition products of cyclic ethers. Examples include ethylene oxide, propylene oxide, epichlorohydrin, styrene oxide, 1,2-butylene oxide and/or tetrahydrofuran with starting compounds which have at least two Zerewitinoff active hydrogen atoms in the molecule, e.g. those described in the book entitled "Polyurethane Chemistry and Technology," part I, page 32 et seq, by J. H. Saunders and K. C. Frisch. Suitable starter compounds include polyhydroxyl compounds such as alkylene glycols, glycerol, trimethylolpropane, pentaerythritol, sorbitol, glucose, glucosides, saccharose and the polyhydroxyl compounds obtainable by the condensation of formaldehyde (formose or formitol). Other examples of suitable starter compounds include water, ammonia and amino alcohols (such as ethanolamine, diethanolamine, triethanolamine, primary and/or secondary amines or polyamines such as ethylenediamine or aniline). The polyether polyols used as starting materials for the preparation of the polymer polyols preferably have equivalent weights of from 100 to 3,000 and a hydroxyl functionality of from 2 to 8. The polyether chains are generally built up of propylene oxide and ethylene oxide units. The ethylene oxide units are arranged statistically along the chain or in connected blocks within and/or at the end of the chain. The polyether polyols obtained in the latter case are particularly highly reactive and have a high proportion of primary hydroxyl groups. They are particularly suitable for use as starting material for the production of highly elastic cold setting flexible foams.

Initiation of the radicals polymers may be carried out with the usual radical forming initiators. They should as far as possible have a very high rate of decomposition. The half-life time of thermal decomposition should be as low as possible under the polymerization conditions in order that a sufficient quantity of radicals will always be available in the reaction medium. Initiators of this type include, for example, organic peroxides (such as benzoyl peroxide or lauryl peroxide), percarboxylic acid esters (such as tertiary butyl peroctoate and tertiary butyl perpivalate), and aliphatic azo compounds. Azoisobutyronitrile is of the greatest commercial importance and for various reasons is an exceptionally suitable initiator for the preparation of polymer polyols. The initiator is preferably used in quantitites of from 0.3 to 2% by weight, based on the total quantity of monomers.

The process according to the invention may be carried out batchwise or continuously. For example, a mixture containing the monomers, the initiator, the transferer and optionally part of the polyether to be used may be added to the polyether which has previously been heated to the polymerization temperature in a reactor equipped with stirrer. Alternatively, a mixture of all of the reactants may be continuously pumped into a reactor and the product removed at the same rate from the overflow.

The temperature at which polymerization is carried out should be at least 100° C., but is preferably 100° to 140° C., most preferably 120° to 130° C. The reaction may be carried out at the pressure which becomes established at the operating temperature in a system which is sealed off from external pressure or it may be carried out in an open system at atmospheric pressure. The atmospheric oxygen should be displaced from the whole apparatus by washing with an inert gas, such as nitrogen or argon. An inert gas atmosphere should be constantly maintained in the system during the process. The product is freed from volatile constituents, in particular from residues of monomer, by the usual method of vacuum distillation, optionally in a thin layer or falling film evaporator.

The polymer polyols prepared by the process of the invention are suitable for the production of all types of polyurethane resins, particularly flexible and semi-rigid polyurethane foams. The polymer polyols are free from coarse particles which are capable of sedimentation and filtration and they have a much lower viscosity than similar products prepared by conventional methods. Another advantage is that the transfer substances according to the invention, which remain in the finished product, are valuable antioxidants which cause no discoloration and which protect the polymer polyol itself as well as any polyurethane foam produced from it against oxidative attack.

Processes for producing polyurethane foams using polymer polyols are known. One of the most important applications of the polymer polyols is their use in the production of flexible elastic and highly elastic as well as semi-rigid foams, to which they impart improved rigidity and weight bearing capabilities combined with suitable ratios of rigidity to unit weight. The substances also have advantageous effects on other properties of the foams, such as the open-cell character and shrinkage resistance of flexible foams. For mechanical processing of the polymer polyols, freedom from agglomerates and a low viscosity are essential preconditions. The usual method of metering with piston pump apparatus sets an upper limit to the viscosity of the material of about 1,500 to 2,000 mPa.s. The formulations containing the polymers must also be kept below these limits.

This invention also relates to a process for the preparation of cellular or non-cellular polyurethane resins comprising reacting
(A) a polyisocyanate with
(B) a polyether polyol modified by graft polymerization and optionally
(C) other low molecular and/or relatively high molecular compounds containing isocyanate reactive hydrogen atoms, optionally in the presence of
(D) blowing agents, catalysts and other known additives, characterized in that the polymer polyols obtainable according to the invention are used as component (B).

The following substances are used for carrying out the process according to the invention: aliphatic, cycloaliphatic, araliphatic, aromatic and heterocyclic polyisocyanates. Examples are described by W. Siefken in Justus Liebigs Annalen der Chemie, 562 pages 75 to 136. Examples include those represented by the formula Q(NCO)$_n$ 

in which
n=2–4, preferably 2 and
Q represents an aliphatic hydrocarbon group having 2 to 8, preferably 6 to 10 carbon atoms, a cycloaliphatic hydrocarbon group having from 4 to 15, preferably 5 to 10 carbon atoms, an aromatic hydrocarbon group having from 6 to 15, preferably 6 to 13 carbon atoms or an araliphatic hydrocarbon group having from 8 to 15, preferably 8 to 13 carbon atoms.

Isocyanates represented by this formula include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3 and -1,4-diisocyanate and mixtures thereof; 1-isocyanato-3,3,5-trimethyl-5-isocyanatomethylcyclohexane (German Auslegeschrift 1,202,785 and U.S. Pat. No. 3,401,190); hexahydrotolylene-2,4- and -2,6-diisocyanate and mixtures thereof; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures therof; diphenylmethane-2,4'- and/or 4,4'-diisocyanate and naphthylene-1,5-diisocyanate.

The following, for example, may also be used according to the invention: triphenylmethane-4,4',4"-triisocyanate, polyphenyl polymethylene polyisocyanates which are obtainable by aniline-formaldehyde condensation followed by phosgenation (British Pat. Nos. 874,430 and 848,671), m- and p-isocyanatophenyl sulfonyl isocyanates (U.S. Pat. No. 3,454,606), perchlorinated aryl polyisocyanates (German Auslegeschrift 1,157,601 or U.S. Pat. No. 3,277,138), polyisocyanates with carbodiimide groups (German Pat. No. 1,092,007 or U.S. Pat. No. 3,152,162 and German Offenlegungsschriften 2,504,400; 2,537,685 and 2,552,350), norbornane diisocyanates (U.S. Patent 3,492,330), polyisocyanates with allophanate groups (British Patent 994,890, Belgium Patent 761,626 and Netherlands Patent Application 7,102,524), polyisocyanates with isocyanaurate groups (U.S. Pat. No. 3,001,973, German Pat. Nos. 1,022,789; 1,222,067 and 1,027,394 and German Offenlegungsschriften 1,929,034 and 2,004,048), polyisocyanates with urethane groups (Belgian Pat. No. 752,261 or U.S. Pat. Nos. 3,394,164 and 3,644,457), polyisocyanates with acylated urea groups (German Pat. Nos. 1,230,778), polyisocyanates with biuret groups (U.S. Pat. Nos. 3,124,605 and 3,201,372 and British Pat. No. 889,050), polyisocyanates prepared by telomerization reactions (U.S. Pat. No. 3,654,106), polyisocyanates with ester groups (British Patents 965,474 and 1,072,956, U.S. Pat. No. 3,567,763 and German Pat. No. 1,231,688), reaction products of the above-mentioned isocyanates with acetals (German Pat. No. 1,072,385), and polyisocyanates containing polymeric fatty acid esters (U.S. Pat. No. 3,455,883).

The distillation residues obtained from the commercial production of isocyanates which still contain isocyanate groups may also be used, optionally dissolved in one or more of the above-mentioned polyisocyanates. Any mixture of the above-mentioned polyisocyanates may be used.

It is generally particularly preferred to use commercially available polyisocyanates, e.g. 2,4- and 2,6-tolylene diisocyanate and any mixtures of these isomers ("TDI"); polyphenylpolymethylene polyisocyanates which are prepared by aniline-formaldehyde condensation followed by phosgenation ("crude MDI"); and polyisocyanates with carbodiimide groups, urethane groups, allophanate groups, isocyanurate groups, urea groups or biuret groups ("modified polyisocyanates"). Particularly preferred are those modified polyisocyanates which are derived from 2,4- and/or 2,6-tolylene diisocyanate or from 4,4'- and/or 2,4-diphenylmethane diisocyanate.

The starting components may also include compounds with a molecular weight of from 400 to 10,000 which have at least two isocyanate reactive hydrogen atoms. These compounds may contain amino groups, thiol groups or carboxyl groups. They are preferably hydroxyl compounds having from 2 to 8 hydroxyl groups with a molecular weight of from 400 to 7,000, preferably 1,000 to 5,000. The hydroxyl compounds are preferably polyesters, polyethers, polythioethers, polyacetals, polycarbonate and polyester amides having at least two, generally 2 to 8 but preferably 2 to 4 hydroxyl groups, which are known for the production of both homogeneous and cellular polyurethanes.

Representatives of the above-mentioned compounds which may be used according to the invention have been described, e.g. in High Polymers, Vol. XVI, "Polyurethane, Chemistry and Technology" by Saunders Frisch, Interscience Publishers, New York, London, Volume I, 1962, pages 32–42 and pages 44–54 and Volume II, 1964, pages 5–6 and 198–199 and in Kunststoff Handbuch, Volume III, Vieweg-Höchtlen, Carl-Hanser-Verlag, Munich 1966, e.g. on pages 45 to 71. Mixtures of the above-mentioned compounds which have at least two isocyanate reactive hydrogen atoms and a molecular weight of from 400 to 10,000 may be used. It is particularly advantageous in some cases to combine low melting and high melting polyhydroxyl compounds (German Offenlegungsschrift 2,706,297).

The starting components may also include compounds having at least two isocyanate reactive hydrogen atoms and a molecular weight of from 32 to 400. These again are compounds containing hydroxyl groups and/or amino groups and/or thiol groups and/or carboxyl groups, preferably hydroxyl groups and/or amino groups. They serve as chain lengthening agents or cross-linking agents. They generally have from 2 to 8, preferably 2 to 4, isocyanate reactive hydrogen atoms.

These compounds with molecular weights of from 32 to 400 and containing two isocyanate reactive hydrogen atoms may also be used as mixtures.

The following are mentioned as examples of such compounds: ethylene glycol; propylene glycol-(1,2) and -(1,3); butylene glycol-(1,4) and -(2,3); pentanediol-(1,5); hexanediol-(1,6); octanediol-(1,8); neopentylglycol; 1,4-bis-hydroxymethyl-cyclohexane, 2-methyl-1,3-propanediol; dibromobutenediol (U.S. Pat. No. 3,723,392); glycerol; trimethylolpropane; hexanetriol(1,2,6); trimethylolethane; pentaerythritol; quinitol; mannitol and sorbitol; castor oil; diethylene glycol; triethylene glycol; tetraethylene glycol; higher polyethylene glycols with molecular weights of up to 400; dipropylene glycol; higher polybutylene glycols with molecular weights of up to 400; 4,4'-dihydroxydiphenylpropane; diethanolamine; N-methyl-diethanolamine; triethanolamine; and 3-aminopropanol.

The low molecular weight polyols used according to the invention may also be mixtures of hydroxyaldehydes and hydroxyketones ("formose") or the polyhydric alcohols obtained from them by reduction ("formitol"). These are formed by the autocondensation of formaldehyde hydrate in the presence of metal compounds as catalysts and compounds capable of enediol formation as cocatalysts (German Offenlegungsschriften 2,639,084; 2,714,084; 2,714,104; 2,721,186; 2,738,154 and 2,738,512). These formoses are advantageously used in combination with aminoplast formers and/or phosphites to produce synthetic resins with improved flame resistance (German Offenlegungsschriften 2,738,513 and 2,738,532). Solutions of polyisocyanate polyaddition products, in particular of polyhydrazodicarbonamides and/or polyurethane ureas containing ionic groups, in low molecular polyhydric alcohols may also be used as polyol components according to the invention (German Offenlegungsschrift 2,638,759).

The following are examples of aliphatic diamines which are suitable for the purpose of the invention: ethylene diamines; 1,4-tetramethylenediamine; 1,11-undecamethylenediamine; 1,12-dodecamethylene diamine; 1-amino-3,3,5-trimethyl-5-amino-methylcyclohexane ("isophorone diamine"); 2,4- and 2,6-hexahydrotolylene diamine and mixtures thereof; perhydro-2,4'- and -4,4'-diaminodiphenylmethane; p-xylylene diamine; bis-(3-aminopropyl)-methylamine; diaminoperhydroanthracenes (German Offenlegungsschrift 2,638,713) and cycloaliphatic triamines (German Offenlegungsschrift 2,614,244). Hydrazines and substituted hydrazines (e.g. methylhydrazines, N,N'-dimethylhydrazines and their homologues), acid dihydrazides (e.g. carbodihydrazide and oxalic acid dihydrazide), dihydrazides of malonic acid, succinic acid, glutaric acid, adipic acid, β-methyladipic acid, sebacic acid, hydracrylic acid and terephthalic acid, semicarbazidoalkylene hydrazides (e.g. β-semicarbazidopropionic acid hydrazide, German Offenlegungsschrift 1,770,591), semicarbazidoalkylene carbazic esters (such as 2-semicarbazidoethyl carbazic ester, German Offenlegungsschrift 1,918,504) and aminosemicarbazide compounds (e.g. β-aminoethyl-semicarbazidocarbonate, German Offenlegungsschrift 1,902,931) may also be used according to the invention. The amino groups may be partly or completely blocked by aldimine or ketimine groups to control their reactivity (U.S. Pat. No. 3,734,894 and German Offenlegungsschrift 2,637,115).

The following are examples of aromatic diamines: bis-anthranilic acid esters (German Offenlegungsschriften 2,040,644 and 2,160,590); 3,5- and 2,4-diaminobenzoic acid esters (German Offenlegungsschrift 2,025,900); the diamines with ester groups (German Offenlegungsschriften 1,803,635; 2,040,650 and 2,160,589; or U.S. Pat. Nos. 3,681,290 and 3,736,350); the diamines with ether groups (German Offenlegungsschriften 1,770,525 and 1,809,172 or U.S. Pat. Nos. 3,654,364 and 3,736,295); 2-halogen-1,3-phenylenediamines optionally substituted in the 5-position (German Offenlegungsschriften 2,001,772; 2,025,896 and 2,065,869); 3,3'-dichloro-4,4'-diamino-diphenylmethane; tolylenediamine, 4,4'-diamino-diphenylmethane; 4,4'-diamino-diphenyldisulfides (German Offenlegungsschrift 2,404,976); diaminodiphenyl dithioethers (German Offenlegungsschrift 2,509,404); aromatic diamines substituted by alkylthio groups (German Offenlegungsschrift 2,638,760); diaminobenzene phosphonic acid esters (German Offenlegungsschrift 2,459,491); aromatic diamines containing sulfonate or carboxylate groups (German Offenlegungsschrift 2,720,166) and high melting diamines (German Offenlegungsschrift 2,635,400). Examples of aliphatic aromatic diamines are the aminoalkylthio anilines (German Offenlegungsschrift 2,734,574).

As chain lengthening agents there may also be used according to the invention compounds such as 1-mercapto-3-aminopropane, substituted or unsubstituted amino acids (such as glycine, alanine, valine, serine or lysine) and substituted dicarboxylic acids (such as succinic acid, adipic acid, phthalic acid, 4-hydroxyphthalic acid or 4-aminophthalic acid).

Compounds which are monofunctional in their reaction with isocyanates may also be used as so-called chain breakers in proportions of from 0.01 to 10% by weight, based on the polyurethane solids content. Monofunctional compounds of this type include, for example, monoamines (such as butylamine and dibutylamine, octylamine, stearylamine, N-methylstearylamine, pyrrolidine, piperidine and cyclohexylamine), monohydric alcohols (such as butanol, 2-ethylhexanol, octanol and dodecanol) and various amyl alcohols, cyclohexanol and ethylene glycol monoethyl ether.

Auxiliary agents and additives may optionally be used, such as water and/or readily volatile inorganic or organic substances as blowing agents. Suitable organic blowing agents include, for example, acetone, ethyl acetate, halogen substituted alkanes (such as methylene chloride, chloroform, ethylidene chloride, vinylidene chloride, monofluorotrichloromethane, chlorodifluoromethane and dichlorodifluoromethane), butane, hexane, heptane or diethylether. As inorganic blowing agents, air, CO$_2$ or N$_2$O may be used. The effect of a blowing agent may also be obtained by the addition of compounds which decompose at temperatures above room temperature to liberate gases, for example nitrogen, e.g. azo compounds (such as azo dicarbonamide or azo isobutyric acid nitrile). Further examples of blowing agents and details concerning the use of blowing agents may be found in Kunststoff-Handbuch, Volume III, published by Vieweg and Höchtlen, Carl-Hanser-Verlag, Munich 1966, e.g. on pages 108 and 109, 453 and 507–510.

Known types of catalysts may be used, e.g. tertiary amines such as triethylamine, tributylamine, N-methylmorpholine, N-ethylmorpholine, N,N,N',N'-tetramethylethylene diamine, pentamethyldiethylenetriamine and higher homologues (German Offenlegungsschriften 2,624,527 and 2,624,528), 1,4-diazobicyclo-(2,2,2)-octane, N-methyl-N'-dimethtylaminoethylpiperazine, bis-(dimethylaminoalkyl)-piperazines (German Offenlegungsschrift 2,636,787), N,N-dimethylbenzylamine, N,N-dimethylcyclohexylamine, N,N-diethylbenzylamine, bis-(N,N-diethylaminoethyl)-adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift 1,720,633), bis-(dialkylamino)-alkyl ethers (U.S. Pat. No. 3,330,782; German Auslegeschrift 1,030,558 and German Offenlegungsschriften 1,804,361 and 2,618,280), and tertiary amines with amide groups (preferably formamide groups) according to German Offenlegungsschriften 2,523,633 and 2,732,292. The known Mannich bases of secondary amines (such as dimethylamine), aldehydes (preferably formaldehyde), ketones (such as acetone, methyl ethyl ketone or cyclohexanone), and phenols (such as phenol, nonylphenol or bisphenol) may also be used as catalysts. Triethanolamine, triisopropanolamine, N-methyl-diethanolamine, N-ethyl-diethanolamine, and N,N-dimethyl-ethanolamine and their reaction products with alkylene oxides (such as propylene oxide and/or ethylene oxide), and secondary-tertiary amines (German Offenlegungsschrift 2,732,292) may also be used.

Silaamines with carbon-silicon bonds (German Pat. No. 1,229,290 or U.S. Pat. No. 3,620,984) may also be used as catalysts, e.g. 2,2,4-trimethyl-2-silamorpholine and 1,3-diethylaminomethyl-tetramethyldisiloxane.

Nitrogen-containing bases such as tetraalkylammonium hydroxides, alkali metal hydroxides (such as sodium hydroxide), alkali metal phenolates (such as sodium phenolate) and alkali metal alcoholates (such as sodium methylate) may also be used as catalysts. Hexahydrotriazines may also be used (German Offenlegungsschrift 1,769,043).

The reaction between isocyanate groups and Zerewitinoff active hydrogen atoms is powerfully accelerated by lactams and azalactams, and the associates first forming between the lactam and the compound which has an acidic hydrogen. Associates of this type and their catalytic action have been described in German Offenlegungsschriften 2,062,288; 2,062,289; 2,117,576 (U.S. Pat. No. 3,758,444); 2,129,198; 2,330,175 and 2,330,211.

Organic metal compounds may also be used as catalysts according to the invention, in particular organic tin compounds. Suitable organic tin compounds, apart from those which contain sulfur, such as di-n-octyl-tin-mercaptide (German Auslegeschrift 1,769,367 and U.S. Pat. No. 3,645,927) are particularly the tin(II) salts of carboxylic acids (such as tin(II)acetate, tin(II)octoate, tin(II)ethyl hexoate and tin(II)laurate), and tin(IV) compounds (such as dibutyl tin oxide, dibutyl tin dichloride, dibutyl tin diacetate, dibutyl tin dilaurate, dibutyl tin maleate and dioctyl tin diacetate).

All of the above-mentioned catalysts may, of course, also be used as mixtures. Combinations of organic metal compounds with amidines, amino pyridines or hydrazinopyridines are of particular interest (German Offenlegungsschriften 2,434,185; 2,601,082 and 2,603,834).

Other representatives of catalysts which may be used according to the invention and details concerning the action of these catalysts may be found in Kunststoff-Handbuch, Volume VII, published by Vieweg and Höchtlen, Carl-Hanser-Verlag, Munich 1966, e.g. on pages 96 to 102.

The catalysts are generally used in a quantity ranging from about 0.001 to 10% by weight, based on the total quantity of compounds which have at least two isocyanate reactive hydrogen atoms.

Surface active additives such as emulsifiers and foam stabilizers may be present. Suitable emulsifiers include e.g. the sodium salts of ricinoleic sulfonates or salts of fatty acids with amines, such as oleic acid diethylamine or stearic acid diethanolamine. Alkali metal and ammonium salts of sulfonic acid (such as dodecylbenzene sulfonic acid or dinaphthylmethane disulfonic acid) or of fatty acids (such as ricinoleic acid) or of polymeric fatty acids may also be included as surface active additives.

The most important foam stabilizers are the polyether siloxanes, especially those which are water-soluble. These compounds generally have a polydimethylsiloxane group attached to a copolymer of ethylene oxide and propylene oxide. Foam stabilizers of this type have been described in U.S. Pat. Nos. 2,834,748; 2,917,480 and 3,629,308. Polysiloxanes polyoxyalkylene copolymers which are branched through allophanate groups (German Offenlegungsschrift 2,558,523) are in many cases particularly interesting.

Reaction retarders (e.g. compounds which are acid in reaction such as hydrochloric acid or organic acid halides), known cell regulators (such as paraffins, fatty alcohols or dimethylpolysiloxanes), pigments and dyes, known flame retarding agents (such as trischloro-ethylphosphate), tricresylphosphate or ammonium phosphate and polyphosphate, stabilizers against aging and weathering, plasticizers, fungistatic and bacteriostatic substances and fillers (such as barium sulfate, kieselguhr, carbon black or whiting) may be used.

Other examples of surface active additives, foam stabilizers, cell regulators, reaction retarders, stabilizers, flame retarding substances, plasticizers, dyes and fillers and fungistatic and bacteriostatic substances which may also be used according to the invention and details concerning the use and action of these additives may be found in Kunststoff-Handbuch, Volume VII, published by Vieweg and Höchtlen, Carl-Hanser-Verlag, Munich 1966, e.g. on pages 103 to 113.

According to the process of the invention, the components are reacted together by the known one-shot prepolymer or semiprepolymer process, in many cases using mechanical devices such as those described in U.S. Pat. No. 2,764,565. Details concerning apparatus which may also be used according to the invention are given in Kunststoff-Handbuch, Volume VII, published by Vieweg and Höchtlen, Carl-Hanser-Verlag, Munich 1966, e.g. on pages 121 to 205.

Production of the foams may according to the invention be carried out inside closed molds. In such a case, the reaction mixture is introduced into a mold, which may be made of a metal, e.g. aluminum, or a synthetic material, e.g. an epoxide resin. The mixture foams up inside the mold to form the shaped product. This process of foaming inside molds may be carried out to produce an article having a cellular structure on its surface or it may be carried out in such a manner that the article has a non-cellular skin and a cellular core. These results may be obtained, in the first case, by introducing just a sufficient quantity of foamable reaction mixture into the mold to fill the mold with foam or, in the second case, by introducing a larger quantity of foamable reaction mixture than is necessary to fill the interior of the mold with foam. This second method is known as "overcharging" (U.S. Pat. Nos. 3,178,490 and 3,182,104).

Foaming in molds is frequently carried out with the aid of known "external mold release agents" such as silicone oils. However, so-called "internal mold release agents" may also be used, optionally in combination with external mold release agents (German Offenlegungsschriften 2,121,670 and 2,307,589).

Cold setting forms may also be produced according to the invention (British Pat. No. 1,162,517 and German Offenlegungsschrift 2,153,086).

Foams may also be produced by the method of block foaming or by the known laminator process.

The following examples serve to explain the process according to the invention. Quantities given are in parts by weight or percentage by weight unless otherwise indicated.

The polyether polyols used in the examples are identified as follows:

Polyol A: A polyoxypropylene triol started on trimethylolpropane, containing 17% by weight of polyoxyethylene blocks in end positions and more than 70% by weight of primary hydroxyl groups, based on the total hydroxyl content and having a hydroxyl number of 35.

Polyol B: A polyoxypropylene triol with a hydroxyl number of about 56 started on trimethylolpropane and containing predominantly secondary hydroxyl end groups.

Polyol C: A linear polypropylene glycol with a molecular weight of 2,000.

Polyol D: A linear polypropylene glycol with a molecular weight of 1,000.

Polyol E: An addition product of polypropylene oxide to trimethylolpropane with a hydroxyl number of about 550 and an average molecular weight of about 300.

AIBN is the abbreviation for azoisobutyronitrile which is used as initiator.

EXAMPLES

EXAMPLE 1

(a) (Comparison) 200 g of polyol A were placed in a flask equipped with dropping funnel, reflux condenser, gas inlet tube and stirrer and heated under nitrogen to 120° C. by means of a heated oil bath. A mixture of 400 g of the same polyol, 240 g of acrylonitrile, 160 g of styrene and 2.0 g of AIBN (0.5%, based on the monomers) was added from the funnel within 2.5 hours while the temperature was maintained in the region of 120° to 130° C. by controlling the heating bath and the rate of introduction of the mixture. The reaction mixture was then stirred for an additional 2 hours at 120° C. and finally stripped in a vacuum of 14 Torr to remove residues of monomer.

Distillation yielded 18 g of distillate, which corresponded to a monomer conversion of 95.5% and a solids content of 38.9%. The dispersion obtained as end product was relatively finely divided and permeated by numerous large stripples and had a viscosity of 10,000 mPa.s measured at 23° C. in a Haake-Viscotester, Spindle No. 1. Part of the solids content sedimented within a few weeks.

(b) Example 1a) was repeated but with the difference that the mixture added to the polyol, in addition, contained 0.4 g of Compound I:

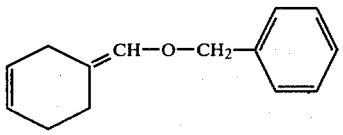

(0.1% based on the monomers). A finely divided dispersion free from coagulate and having a viscosity of 3,750 mPa.s was obtained. Vacuum distillation yielded 13.5 g of distillate, corresponding to a monomer conversion of 96.6% and a polymer content of 39.2%. The dispersion was resistant to sedimentation and could be filtered without residue through a Perlon gauze with a mesh of about 150 PM.

EXAMPLE 2

This example illustrates the action of a graft transferer according to the invention for grafting on a polyoxypropylene triol with a molecular weight of 3,000 polyol B. The following experiments (a) and (b) were carried out as described in Example 1. 200 g of polyol B were in each case introduced into the reaction vessel and heated to 120° C. under nitrogen, and the following mixtures were then added:

|  | Experiment a) | Experiment b) |
|---|---|---|
| Polyol B | 600 g | 600 g |
| Styrene | 90 g | 90 g |
| Acrylonitrile | 110 g | 110 g |
| AIBN | 2 g | 2 g |
| Compound I | — | 2 g |

Experiment (a) yielded a dispersion free from agglomerate and with a viscosity of from 5,500 mPa.s at 23° C. The product from experiment (b) had a viscosity of only 1,500 mPa.s. The polymer content was in both cases found to be 19.7%.

EXAMPLE 3

A mixture of 80 g of polyol A and 120 g of the short chained trifunctional polyol E were heated to 120° C. under nitrogen. To this mixture was added a mixture of polyol A, 300 g polyol E, 120 g of styrene, 180 g of acrylonitrile, 3 g of AIBN and 1.5 g of Compound II:

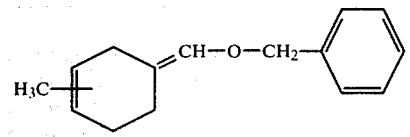

The resulting product was free from agglomerate and stable to sedimentation and had a viscosity of 6,000 mPa.s at 23° C. For comparison, the experiment was repeated without the addition of Compound II. The product in this case was found to have a viscosity of 17,000 mPa.s. In further experiment, the quantity of Compound II added was increased to 3 g. The viscosity of the dispersion obtained was thereby further reduced to 3,900 mPa.s. The two dispersions prepared using Compound II were formulated with trichloro fluoromethane and the usual auxiliary agents and additives to form a stable polyol component which was introduced into a two-component dosing apparatus equipped with a high pressure mixing head and piston pumps, where it was mixed with a commercial polymethylene polyphenyl polyisocyanate which had been prepared by the phosgenation of a condensation product of aniline and formaldehyde. The formulation could easily be transported and dosed with reproducible accuracy and gave rise to high quality integral rigid foam moldings which were free from flow marks.

EXAMPLE 4

A mixture of 100 g of styrene, 200 g of acrylonitrile, 0.9 g of AIBN and 3 g of Compound II was introduced dropwise into a mixture heated to 100° C. of 240 g of polyol A and 360 g of polyol E. The product had a viscosity of 1,400 mPa.s whereas the same experiment carried out without the addition of Compound II resulted in a tough paste with a viscosity of 80,000 mPa.s

EXAMPLE 5

The following mixtures were added dropwise, in each case to 200 g of polyol A at 125° C. while a slow stream of nitrogen was passed through the contents of the reaction vessel:

|  | Experiment (A) | Experiment (B) | Experiment (C) |
|---|---|---|---|
| Polyol A | 500 g | 500 g | 500 g |
| Styrene | 120 g | 120 g | 120 g |
| Acrylonitrile | 180 g | 180 g | 180 g |
| AIBN | 3 g | 3 g | 3 g |
| Compound I | 3 g | — | — |
| Compound II | — | 3 g | — |
| Compound III: | — | — | 3 g |

Compound III:

H₃C—⌬=CH—O—CH₂—CH(C₂H₅)—C₄H₉

The following properties were determined after degasification under vacuum.

|  | A) | B) | C) |
|---|---|---|---|
| Viscosity at 23° C. (mPa.s) | 4,000 | 3,500 | 4,100 |

| | A) | B) | C) |
|---|---|---|---|
| Polymer content (%) | 28.3 | 28.2 | 28.3 |

The same experiment carried out without the addition of Compounds I, II or III resulted in a dispersion with a viscosity of 70,000 mPa.s which was permeated with coarse particles of agglomerate and had a polymer content of 28.5%.

EXAMPLE 6

The advantage of using more highly concentrated polymer polyol dispersions are demonstrated by the following comparison.

50 parts of a commercial polymer polyol with a solids content of 19.8% used for the production of superelastic polyurethane flexible foam were mixed with 50 parts of a polyoxypropylene triol started on trimethylolpropane, containing 13% of polyoxyethylene blocks in end positions and having a hydroxyl number of 28 and a primary hydroxyl group content of over 70% (mixture A). An analogous mixture was prepared using the polymer polyol B) from Example 5 (mixture B). Both of the mixtures were worked up into a freely expanding highly elastic flexible foam according to the formulations given below:

| | Foam 1 | Foam 2 |
|---|---|---|
| Mixture A | 100 parts | — |
| Mixture B | — | 100 parts |
| Water | 2.7 parts | 2.7 parts |
| Triethylenediamine | 0.15 part | 0.15 part |
| Bis-N,N-dimethylamino-ethylether | 0.08 part | 0.08 part |
| N-methylmorpholine | 0.8 part | — |
| Silicone oil | 1.0 part | 1.0 part |
| Polyether-polysiloxane foam stabilizer | 0.1 part | 0.1 part |
| Polyisocyanate mixture of 80% tolylene diisocyanate and 20% commercial polymethylene polyphenyl isocyanate | index 100 | index 100 |

The following mechanical properties were determined on the foams obtained:

| | Foam 1 | Foam 2 |
|---|---|---|
| Gross density according to DIN 53 420 (kg/m³) | 45 | 45 |
| Tensile strength according to DIN 53 571 (kPa) | 122 | 147 |
| Elongation at break (%) | 122 | 118 |
| Compression resistance according to DIN 53 577 (kPa) | 4.7 | 5.3 |
| Tear propagation resistance according to ASTM D 1564 (kN/m) | 0.36 | 0.43 |
| Pressure deformation residue according to DIN 53 572 (%) 22 hours at 70° C. | | |
| 50% compression | 3.6 | 3.9 |
| 90% compression | 5.3 | 5.4 |

It was observed that when the more highly concentrated polymer polyol was used to produce a foam with the same unit weight, the tensile strength was increased by about 20%, the compression resistance by about 15% and the tear propagation resistance by about 20% while the elongation at break and pressure deformation residue remained constant within the accuracy of measurement.

EXAMPLE 7

12 kg of polyol A were heated to 120° C. in a nitrogen atmosphere in a 100 liter stirrer vessel of refined steel which was equipped with a heating jacket, a reflux condenser, an anchor blade stirrer and a metering device which was supplied with contents from a storage vessel which could be cooled. A mixture of 44 kg of polyol A, 9.6 kg of styrene, 14.4 kg of acrylonitrile, 240 g of AIBN (1.0%, based on the monomer) of 60 g of Compound I (0.25%, based on the monomer) was introduced over a period of 5 hours (feed rate 14.5 liters per hour) from two dropping vessels, each of 10 liters capacity, which were filled alternately from the storage tank by application of a vacuum. The speed of stirring was adjusted to prevent reaction mixture from spraying the wall of the vessel. The reaction temperature rose slightly due to the heat of reaction liberated during addition of the mixture and was maintained below 125° C. by occasionally switching on a cooling circulation. Stirring was continued for 2 hours after all of the mixture had been added and a vacuum of 2 Torr was then produced, whereby all volatile constituents were distilled off through a descending condenser into a receiver cooled to 78° C. which had two cooling traps attached. The total quantity of distillate was 920 g, which corresponded to a monomer conversion of 96.2% and a polymerized styrene and acrylonitrile content of 29.2%. The product was an almost white dispersion with a viscosity of 2,800 mPa.s at 25° C. which could be completely filtered. Oxygen analysis of the separate solid exhaustively extracted with methanol gave a value of 2.3%. This corresponded to a quantity of chemically fixed polyether used as starting material of 7.8%, from which the dispersion was calculated to have a solids content of 31.7% and a theoretical hydroxyl number of 23.9. The hydroxyl number found was 23.5. When the experiment was repeated without the addition of Compound I, a thick dispersion with a viscosity of 35,000 mPa.s was obtained which was permeated with stipples and coarse particles of agglomerate.

What is claimed is:

1. A process for the preparation of modified polyether polyols comprising polymerizing of from 1 to 50 parts by weight of a mixture of 20 to 100% by weight (based on the total quantity of monomers) of acrylonitrile and 0 to 80% by weight of styrene in 50 to 99 parts by weight of the polyether polyol in the presence of a polymerization initiator which yields radicals, wherein said polymerization is carried out in the presence of from 0.1 to 1.5% by weight, based on the total quantity of monomers put into the process, of a compound of the formula:

A=CH—X—R wherein
A represents a divalent group

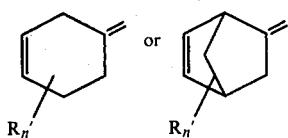

R represents a $C_{1-18}$ alkyl, $C_{1-10}$ cycloalkyl, or substituted or unsubstituted benzyl group, R' represents $C_{1-8}$ alkyl group, n represents 0, 1 or 2 and X represents oxygen or sulfur.

2. The process of claim 1, wherein the temperature during said polymerization is in the range of 100° C. to 140° C.

3. The process of claim 1, wherein N=0 or 1, R represents a methyl group and R' represents a $C_1$-$C_6$ alkyl group, a benzyl group or a cyclohexyl group.

4. The process of claim 1, wherein 10 to 40 parts by weight of the monomer mixture is used.

5. The process of claim 1, wherein 40 to 80% by weight of the total monomer mixture is acrylonitrile.

6. The process of claim 1, wherein 20 to 60% by weight of the total monomer mixture is styrene.

7. The process of claim 1, wherein 50 to 99 parts by weight of said polyether polyol is used.

8. The process of claim 1, wherein R is a $C_{1-8}$ alkyl, cyclohexyl, cyclohexylmethyl or benzyl group.

9. The process of claim 1, wherein R' is a methyl group.

10. The process of claim 1, wherein said compound of the formula: A=CH—X—R is present in a quantity of 0.5 to 1.2% by weight based on the total quantity of monomers used.

11. The process of claim 1, wherein said polymerization initiator is selected from the group consisting of organic peroxides, percarboxylic acid esters, and aliphatic azo compounds and is used in a quantity of from 0.3 to 2% by weight based on the total quantity of monomer.

12. The process of claim 1, wherein said compound of the formula A=CH—X—R is

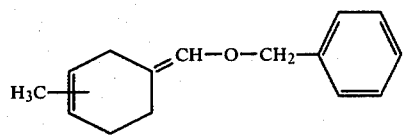

13. The process of claim 1, wherein said compound of the formula A=CH—X—R is

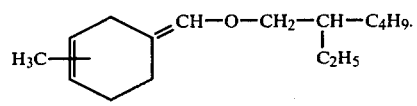

14. The product of claim 1.

15. In a process for the preparation of a cellular or non-cellular polyurethane resin comprising reacting
(A) a polyisocyanate with
(B) a polyether polyol modified by graft polymerization and optionally
(C) other higher molecular and/or low molecular compounds containing isocyanate reactive hydrogen atoms, optionally in the presence of
(D) blowing agents, catalysts and other known additives, the improvement comprising employing a modified polyether polyol prepared by a process comprising polymerizing from 1 to 50 parts by weight of a mixture of 20 to 100% by weight (based on the total quantity of monomers) of acrylonitrile and 0 to 80% by weight of styrene in 50 to 99 parts by weight of the polyether polyol in the presence of a polymerization initiator which yields free radicals, wherein said polymerization is carried out in the presence of from 0.1 to 1.5% by weight, based on the total quantity of monomers put into the process, of a compound of the formula:

A=CH—X—R wherein

A represents a divalent group

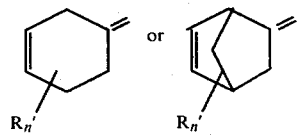

R represents a $C_{1-18}$ alkyl, $C_{1-10}$ cycloalkyl, or substituted or unsubstituted benzyl group, R' represents $C_{1-18}$ alkyl group, n represents 0, 1 or 2 and X represents oxygen or sulfur.

* * * * *